No. 894,114. PATENTED JULY 21, 1908.
L. CARLBERGER.
INCUBATOR.
APPLICATION FILED DEC. 4, 1905.
2 SHEETS—SHEET 1.
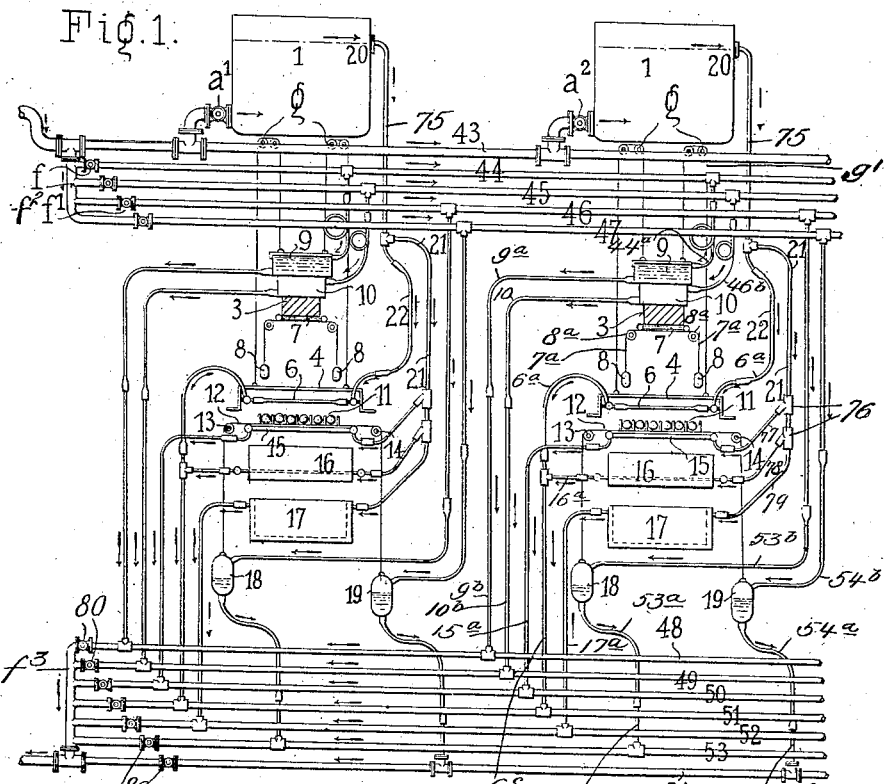
Fig. 1.
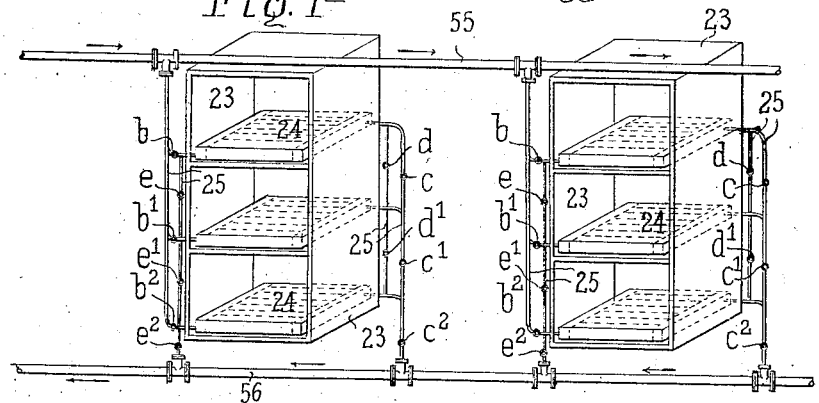
Fig. 1ᵇ.
Witnesses:
Inventor
Leo Carlberger
By James L. Norris

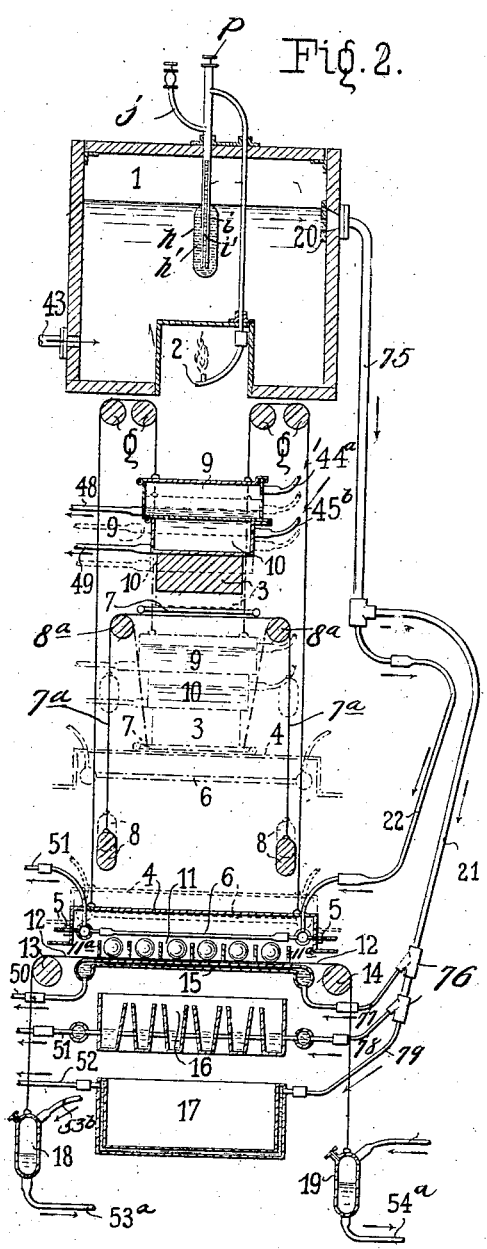
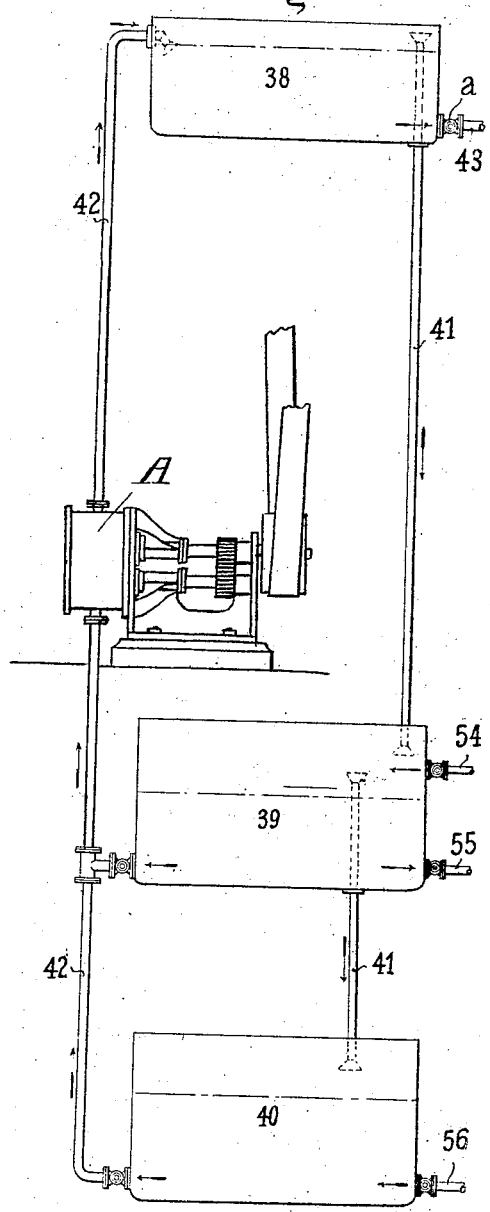

UNITED STATES PATENT OFFICE.

LEO CARLBERGER, OF VIENNA, AUSTRIA-HUNGARY.

INCUBATOR.

No. 894,114.

Specification of Letters Patent.

Patented July 21, 1908.

Application filed December 4, 1905. Serial No. 290,245.

*To all whom it may concern:*

Be it known that I, LEO CARLBERGER, subject of the Emperor of Austria-Hungary, residing at Vienna, Austria-Hungary, have invented certain new and useful Improvements in Incubators, of which the following is a specification.

The present invention relates to an installation for incubating simultaneously different species of eggs of poultry or eggs of one species, but of different sizes, in any desired number, and consists substantially of any number of independent incubators with foster-mothers of which each has its separate heat regulator and can be separately adjusted for any desired working temperature. These incubators and foster-mothers are included in a common circuit of fluid which circulates through all the apparatus, and by the aid of this fluid all the eggs in course of hatching in each apparatus can be rotated, set in the same direction, and aired in a uniform manner; the fluid is capable of being regulated from a single central station as to quantity, speed and special action. In this manner the eggs are subjected to the action of heat from above and from below, and too much evaporation of the albuminous fluid is prevented by automatically generated moisture, while the foster-mothers are fed from the water of the incubators that flows into a common reservoir, in a manner that can be regulated from a central station.

In the drawings: Figures 1, 1$^a$ and 1$^b$ illustrate, diagrammatically, an incubating apparatus in accordance with this invention. Fig. 2 is a sectional view illustrating the single incubator.

Like reference characters designate corresponding parts throughout the views.

From any suitably operated pumping apparatus, a conventional form of which is designated by A, there leads a pipe 42 which in turn is connected to a main reservoir 38 located preferably above the pumping apparatus and in horizontal alinement with any number of auxiliary reservoirs, only two of which are disclosed in the drawings, it being understood that the invention in its broader aspects comprehends the employment of any desired number of reservoirs, incubating apparatus and appurtenances for performing the recited functions. In each auxiliary reservoir is arranged a thermostat for regulating the supply of fuel. By way of example, the thermostat is utilized for regulating the supply of gas and is operated when the fluid in the auxiliary reservoir 1 reaches or exceeds a predetermined temperature. The thermostat in Fig. 2 of the drawings comprises a reservoir $h$ in which extends a tube $i$ communicating with a gas conduit $j$. Within the reservoir $h$ of the thermostat is a quantity of alcohol $h'$ and within the tube $i$ is a quantity of controlling fluid $i'$, as mercury. The thermostat is controlled through the medium of a rod $p$, the construction of the thermostat being such that it will gradually check the inflow of gas. The thermostat is, furthermore, provided with suitable means to prevent the extinction of the heating flame. It will be said, however, that any suitable form of thermostat can be employed.

Leading from the main reservoir 38 and suitably connected to the auxiliary reservoirs 1, 1, is an outlet pipe 43 having connected thereto a header, as $f^2$, the function of which will be hereinafter explained. The pipe 43 is preferably arranged parallel to the several reservoirs, and adjacent its points of connection therewith is provided with turn-plugs $a$, $a'$ and $a^2$ for controlling the flow of liquid to said reservoirs. Connected to and depending from the auxiliary reservoirs 1, 1 are outlet pipes 75, 75, branched as at 21 and 22, the former branch being fixed and fitted with suitable Y-unions 76 whereby the liquid is supplied through three sub-branches 77, 78 and 79 respectively, to radiator pipes 15, 90 a moisture producing tank 16 and a water-jacketed hatching chamber 17. The branch 22 communicates with the header with which is connected a plurality of resilient radiator pipes or tubes 6 adjustably secured, as at 5 to the sides of the cover 4 for the egg-carrying tray 11. The tubes 6 owing to their resiliency may contact with the eggs without breaking them and may be drawn or extended by tensile stress and thus be made to accommodate various sized trays. The header $f^2$ is common to a series of lead pipes 43, 44, 45, 46 and 47, they in turn supplying the auxiliary reservoirs 1, 1, the chambered counterweights 9 and 10 and the liquid receptacles 18 and 19 respectively. The inlets 44$^a$, 44$^b$, 6$^a$, 53$^b$, and 54$^b$ and outlets 9$^a$, 10$^a$, 6$^b$, 53$^a$ and 54$^a$ of the respective movable fluid containing chambers just referred to, and the radiator pipes 6, are flexible, the said outlets communicating with the stand-pipes 9$^b$, 10$^b$, 6$^c$, 53$^c$ and 54$^c$, the latter, together with outlet pipes 15ª and 17ª being connected through the horizontally arranged discharge pipes 48, 49, 50, 51, 52, 53, 54, and a header $f^3$ to a common reservoir 39. Each of the discharge pipes is provided with a turn-plug, as at 80.

The reservoir 39 serves a dual purpose in that it receives all the liquid from the incubators and then feeds the chick-rearing devices 23, the said liquid being eventually discharged into the reservoir 40 connected to reservoir 39 by the overflow pipe 41, then raised by a pump A through pipe 42, and so on, as hereinbefore described. The chick-rearing devices arranged below the single incubators comprise storied frames 23 in which are mounted boilers 24 suitably connected by double conduits 25 at $b$, $b'$ $b^2$, $c$, $c'$, and $c^2$, $d$, $d'$, and $d^2$, and $e$, $e'$ and $e^2$, the said conduits being in turn connected to inlet pipes 55 and outlet pipes 56. By manipulating the several valves or turn-plugs the liquid enters the several boilers 24 and thereby produces a uniform heat in each compartment; or the boilers may be switched in series and a variation in temperature in each compartment produced. Below the reservoir 1 in each instance are arranged, preferably, two pairs of rollers $g$, $g$ over which pass cords or ropes $g'$ which connect the cover 4 of the incubator with the solid counter-weight 3 and the fluid containing chambered counterweights 9 and 10. Interposed between the suspending means is a stopping or arresting device 7 mounted on a cord or strip 7ª, the latter passing over rollers 8ª and having counterweights 8 attached to each end. The tray 11 comprises suitably spaced partitions 11ª attached in any convenient manner to the frame and a flexible bottom 12 of pervious material supported by rollers 13 and 14 directly above the radiator pipes 15, each end of the said bottom being connected to liquid receptacles 18 and 19, the latter effecting the desired movement of the bottom, and, in consequence thereof, the turning of the eggs, as will be hereinafter explicitly referred to.

When the predetermined head of pressure above the liquid outlets 20 has been attained by means of the mechanical power installation A and the turn-plug 80 of a common discharge pipe 51 has been opened, the liquid in all the incubators begins to circulate with perfect uniformity through the tube 6 as well as through the moisture producing tank 16. The upper part or cover 4 of the incubator boxes, which are normally kept in equilibrium by weights 3 suspended over rollers $g$, descends by reason of the additional weight of the liquid flowing through the tubes 6 until the latter are in intimate contact with the eggs and tray 11. When, however, it is desired to turn the eggs this is effected in the following manner: On opening the turn-plug $f$ of the pipe 44 the tanks 9 that serve to increase the counterweight 3 are filled; the weights become heavier and descend to the stop device 7, simultaneously raising the upper part or cover 4 of the incubators in a position free from contact with the eggs in tray 11, as shown in dotted lines in Fig. 2. On opening, at the same time, the cock $f'$ of pipe 46, the tanks 18 are filled alternately, which, becoming heavier, obviously move the flexible bottom or fabric 12 and thereby turn the eggs.

In lieu of turning the eggs in a manner as referred to the two rollers 13, 14 can be turned manually and since this operation need not be attended to more often than once in twenty-four hours, it does not require any considerable amount of work.

When it is desired to air the eggs completely, the pipe 45 is opened so that the tanks 10 become filled, and the balance weights 3 are thereby weighted so heavily that they also force down the stops 7, raising counterweights 8 of these stopping devices and also the upper parts or covers of the hatching boxes from off the eggs to a corresponding distance. By opening the outlets of the pipes 48, 49 respectively, the original condition of affairs can be reëstablished.

I claim—

1. An incubating plant comprising a plurality of incubators, a foster mother for each incubator, means for circulating a fluid through all of the incubators, means whereby the eggs in the course of hatching in each incubator can be rotatably set in the same direction and aired in a uniform manner, valve controlled means for controlling said fluid from a single station, means whereby each incubator is capable of separate adjustment as to temperature, and means whereby each foster mother is capable of separate adjustment as to temperature.

2. An incubating plant comprising a plurality of egg trays, counter-balanced covers for each of the trays, a pair of fluid-receiving tanks superposed over each of the covers and connected thereto, a heating device arranged in operative relation with respect to each of said covers, valve controlled means for supplying liquid to one of the tanks of the pair, thereby elevating the cover to remove the heating device from the eggs, and means for filling the other tank of the pair thereby elevating the cover to ventilate the eggs.

3. An incubating plant comprising an incubator provided with a pervious fabric upon which the eggs are adapted to rest, rotatable means for shifting the fabric, thereby turning the eggs, a liquid-containing tank for shifting said means, and means for circulating a heating fluid through the incubator.

4. An incubating plant comprising a tray adapted to support the eggs, a vertically movable counter-balanced cover for said tray, a heating device arranged over the eggs and carried by the cover, means for elevating the cover to remove the heating device, and means operating in conjunction with said first mentioned elevating means for elevating the cover to ventilate the eggs.

5. An incubating plant comprising a tray adapted to support the eggs, a counter-balanced cover for said tray, a heating device arranged over the eggs and carried by the cover, means for elevating the cover to remove the heating device, means operating in conjunction with said first mentioned elevating means for elevating the cover to ventilate the eggs, and means for turning the eggs.

6. An apparatus of the character described comprising a main liquid reservoir, a plurality of incubators, a pair of tanks for each of the incubators, counterbalanced covers for the incubators, heating devices for the eggs in each of the incubators, and means for applying liquid to the tanks whereby the cover will be raised to remove the heating device and also raised to ventilate the eggs.

7. An incubating plant comprising a main liquid reservoir, a plurality of incubators embodying egg holding trays each provided with a cover, a pair of tanks arranged in operative relation with respect to said covers, counterbalanced means for the covers, heating devices for the eggs in the trays, means for supplying liquid to said tanks whereby the cover is raised to remove the heating devices and whereby the cover is raised to ventilate the eggs in the tray, a foster mother associating with each of the incubators, means for circulating a heating fluid through said heating devices, and means for circulating a heating fluid through said foster mothers.

In testimony whereof I have hereunto set my hand in presence of two subscribing witnesses.

LEO CARLBERGER.

Witnesses:
 JOSEF RUBRESCH,
 ALVESTO S. HOGUE.